United States Patent
Medina (10) Patent No.: US 8,221,675 B2
(45) Date of Patent: Jul. 17, 2012

(54) DIRECT SMELTING VESSEL AND COOLER THEREFOR

(75) Inventor: Hector Medina, Melville (AU)

(73) Assignee: Technological Resources Pty. Limited, Victoria (AU)

( * ) Notice: Subject to any disclaimer, the term of this patent is extended or adjusted under 35 U.S.C. 154(b) by 504 days.

(21) Appl. No.: 12/301,205

(22) PCT Filed: May 18, 2007

(86) PCT No.: PCT/AU2007/000688
§ 371 (c)(1),
(2), (4) Date: Oct. 30, 2009

(87) PCT Pub. No.: WO2007/134382
PCT Pub. Date: Nov. 29, 2007

(65) Prior Publication Data
US 2010/0044935 A1    Feb. 25, 2010

(30) Foreign Application Priority Data
May 18, 2006 (AU) ................. 2006902687

(51) Int. Cl.
*C21C 5/46* (2006.01)
(52) U.S. Cl. ........................ 266/194; 266/241
(58) Field of Classification Search ............... 266/241, 266/193, 194
See application file for complete search history.

(56) References Cited

U.S. PATENT DOCUMENTS

| | | | |
|---|---|---|---|
| 5,332,199 A | 7/1994 | Knapp et al. | |
| 5,662,860 A * | 9/1997 | Klaassen et al. | 266/158 |
| 6,267,799 B1 | 7/2001 | Innes et al. | |
| 6,280,681 B1 | 8/2001 | MacRae | |
| 6,322,745 B1 | 11/2001 | Leigh et al. | |
| 2002/0001332 A1 | 1/2002 | Shver | |

FOREIGN PATENT DOCUMENTS

| | | |
|---|---|---|
| EP | 1 170 385 A2 | 1/2002 |
| EP | 1 553 192 A2 | 7/2005 |
| GB | 496289 | 11/1938 |
| WO | WO 96/31627 | 10/1996 |
| WO | WO 00/001854 A1 | 1/2000 |
| WO | WO 01/60123 A1 | 8/2001 |
| WO | WO 03/034791 A1 | 4/2003 |

OTHER PUBLICATIONS

European Search Report, dated Dec. 3, 2009.

* cited by examiner

*Primary Examiner* — Scott Kastler
(74) *Attorney, Agent, or Firm* — Finnegan, Henderson, Farabow, Garrett & Dunner, LLP.

(57) ABSTRACT

A direct smelting vessel and a hearth cooler element are disclosed. The vessel includes a refractory lined hearth. An inner surface of an upper part of the hearth extends upwardly and outwardly to side walls of the vessel. The upper part of the hearth incorporates a hearth cooler disposed outwardly behind the refractory lining of that part of the hearth and below the cooling panels on the side walls of the vessel. The hearth cooler comprises a plurality of cooler elements. Each cooler element has a hollow open-backed shell structure having base, top and side walls formed integrally in a cast structure and incorporating coolant flow passages.

37 Claims, 6 Drawing Sheets

DIRECT SMELTING VESSEL AND COOLER THEREFOR

CROSS REFERENCE TO RELATED APPLICATION

This application is a national phase application based on PCT/AU2007/000688, filed May 18, 2007, which claims the priority of Australian Patent Application No. 2006902687, filed May 18, 2006, the content of both of which is incorporated herein by reference.

TECHNICAL FIELD

The present invention relates to vessels used for performing direct smelting to produce molten metal in pure or alloy form from a metalliferous feed material such as ores, partly reduced ores and metal-containing waste streams.

The present invention relates more particularly to coolers used as a part of the vessels A known direct smelting process, which relies on a molten metal layer as a reaction medium, and is generally referred to as the HIsmelt process, is described in U.S. Pat. No. 6,267,799 and International Patent Publication WO 96/31627 in the name of the applicant. The HIsmelt process for producing molten iron as described in these publications comprises:
  (a) forming a bath of molten iron and slag in a vessel;
  (b) injecting into the bath:
    (i) a metalliferous feed material, typically metal oxides; and
    (ii) a solid carbonaceous material, typically coal, which acts as a reductant of the metal oxides and a source of energy; and
  (c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath, in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. Offgases resulting from the post-combustion of reaction gases in the vessel are taken away from the upper part of the vessel through an offgas duct.

The HIsmelt process enables large quantities of molten metal to be produced by direct smelting in a single compact vessel. This vessel must function as a pressure vessel containing solids, liquids and gases at very high temperatures throughout a smelting operation which can be extended over a long period. As described in U.S. Pat. No. 6,322,745 and International Patent Publication WO 00/01854 in the name of the applicant the vessel may consist of a steel shell with a hearth contained therein formed of refractory material and side walls extending upwardly from the sides of the hearth and provided with water cooled panels. The HIsmelt Process is turbulent and this results in refractory erosion of the upper part of the hearth due to chemical attack and possibly physical erosion by slag and hot metal washing and splashing against the refractory material in the upper part of the hearth. This erosion is greater than is typically experienced in the hearths of blast furnaces in which the hot metal and slag is relatively quiescent.

The present invention enables a significant reduction of such refractory erosion of the hearth.

DISCLOSURE OF THE INVENTION

According to the invention there is provided a direct smelting vessel including a refractory lined hearth, side walls extending upwardly from the hearth, and a plurality of cooling panels disposed around the side walls so as to form an interior lining on those side walls, wherein an inner surface of an upper part of the hearth extends upwardly and outwardly to the side walls of the vessel and said upper part of the hearth incorporates a cooler disposed outwardly behind the refractory lining of that part of the hearth and below the cooling panels on the side walls of the vessel.

The vessel may be used, by way of example, for producing iron and/or ferro alloys by a molten bath-based direct smelting process and it may further include a roof of the vessel, devices for tapping molten metal and slag from the vessel, lances for supplying solid feed materials including solid ferruginous material and carbonaceous material into the vessel and lances for supplying an oxygen-containing gas into the vessel to post-combust gaseous reaction products generated in the direct smelting process.

The hearth cooler may have a cooling surface extending upwardly and outwardly immediately behind the refractory lining of the upper part of the hearth.

More specifically a bottom part of the hearth and the side walls of the vessel may be generally cylindrical, the cooling surface of the cooler may extend upwardly and outwardly and the refractory lining of the upper part of the hearth may overlay that cooling surface.

The refractory lining of the upper part of the hearth may be formed by courses of refractory bricks laid over the cooler.

Below the upper part of the hearth, the hearth lining may be formed by cylindrical courses of refractory bricks.

The cooler may be formed by a plurality of cooler elements disposed in an array extending circumferentially around the upper part of the hearth.

The cooler elements may be connected to an outer shell of the side wall of the vessel and consequently are not dependent on an underlying part of the hearth to support the elements.

Each cooler element may be comprised of a hollow open-backed cast shell structure having base, top, front and side walls formed integrally together in the cast shell structure and incorporating coolant flow passages for flow of coolant therethrough, with the top wall comprising a solid surface formed at least in part as a sloping surface.

The top wall of each cooler element may have an surface that inclines downwardly as the sloping surface to the front wall of the cast shell structure. This sloping surface and a surface of the front wall define a front face of the element.

The vertical extent of the front wall of each cooling element may be less than the vertical extent of the sloping surface of the top wall of the element.

The top wall of each cooler element may have a section that is parallel to the base wall and extends from the rear of the cooler element and defines a flat land.

The size of the land of each cooler element may be selected so that there is a transition to the downwardly sloping front face of the element at a point that is adjacent a front wall of the cooling panels that form part of the side walls of the vessel. That is, the radial extent of the land may be equal to the radial extent of the cooling panels that sit above the land. This selection minimises the possibility of a step forming at the base of the cooling panels which may allow accretions to form a dam that might trap hot metal adjacent the cooling panel, the cooling element or the vessel shell. This is of particular concern where the cooling panels are of a type formed from a serpentine arrangement of pipes with apertures therebetween.

The top wall may be stepped such that outer surface has a series of stepped tier surfaces extending across the cooler element to support refractory bricks of the refractory lining of the upper part of the hearth.

The side walls of each cooler element may provide a solid surface.

The side walls of each cooler element may be convergent toward the front wall of the element.

More specifically the cooler may be formed as a ring with the cooler elements each shaped as a segment of that ring with their side walls extending radially of the ring and their front walls curved to extend circumferentially of the ring.

The side walls of each cooler element may be formed with flat surfaces.

The cooler elements may be positioned in side by side relationship with a small clearance between adjacent elements.

The clearance between adjacent cooling elements may be 20 mm or less.

Preferably the clearance is 15 mm or less.

More preferably the clearance is in the range of 5-20 mm.

The cooler elements may have coolant inlet and outlet connectors for flow of coolant to and from the coolant flow passages.

The coolant flow passages may be formed by tubes cast into the shell structure of each coolant element and extending between inlets and outlets at the open back of the shell.

The invention further provides a cast copper or a copper alloy cooler element for cooling refractory material in a hearth of a smelting vessel, comprising a hollow open-backed shell structure having base, top, front and side walls formed integrally in a cast structure and incorporating coolant flow passages therein formed by tubes cast into the shell structure and extending between inlets and outlets at the open back of the element, with the top wall providing a solid surface formed at least in part as a sloping surface.

The tubes that form the coolant flow passages may be disposed in an array extending throughout the base, top, front and side walls of the cooler element.

The coolant flow passages may be in the form of at least two continuous tubes which follow serpentine paths extending through the base, top, front and side walls.

The serpentine paths are preferably adjacent serpentine paths.

The adjacent serpentine paths may be displaced with respect to each other to provide a substantially even distribution of tubes through at least the front and base walls of the cooling element.

The tubes that form the coolant flow passages may be structured so that there is no doubling back of the tubes on the base wall.

Each tube that forms one coolant flow passage may be structured so that coolant can flow in one flow path through the top wall and the front wall and then in a reverse flow path through the side walls and the base wall to an outlet or vice versa.

Preferably the flow paths of each tube follow a serpentine path across and adjacent to the top, front, side, and base walls of the cooling element.

Preferably the flow path of each tube through the base wall and the side walls is a sequential path between a front of the cooling element and a rear of the cooling element passing through the base wall and the side walls.

More preferably the sequential path is a serpentine path that passes repeatedly through each of the base wall and the side walls.

In an another, although not the only other, embodiment, one tube that forms one coolant flow passage may be structured so that coolant flows in a serpentine path from an inlet of the flow passage down the top wall and the front wall and then back up the front wall and the top wall to an outlet. In addition, another tube that forms another coolant flow passage may be structured so that coolant flows in a serpentine path from an inlet of the flow passage along the side walls and the base wall to the front of the cooling element and then back along the side walls and the base wall to an outlet.

The top and front walls may form one generally inclined surface that slopes downwardly from the rear of the cooler element to the base wall at the front of the cooler element and defines a front face of the element.

The top wall may have a section that is parallel to the base wall and extends from the rear of the cooler element and defines a flat land.

The inlets and outlets for the coolant flow passages may initially pass through the parallel section of the top wall.

There may be coolant inlet and outlet connections for flow of coolant to and from the tubes that form the coolant flow passages.

The sloping surface of the top wall may be stepped such that its outer surface has a series of stepped tier surfaces extending across the element.

The tiers may be sized to separately receive a single row of refractory bricks resting on the tier.

The front face of each step in an upper surface on the top wall may have a linear groove extending across the cooling element.

An underside of the base wall may be provided with a series of linear grooves extending across the cooling element.

The cooling element may be shaped as a ring segment with convergent side walls such that a plurality of such elements disposed side by side can form a circular ring cooler with the bases of the elements forming a flat ring base, the top walls of the elements forming an upwardly and outwardly inclined ring surface having horizontal flat tiers and the side walls of the elements extending radially of the ring.

The invention further provides a cooling element for location in a refractory lined hearth of a direct smelting vessel, the cooling element comprising a hollow open-backed shell structure having water cooled base, top, front and side walls formed integrally in a cast structure, with the cooling element being adapted for co-location with other cooling elements in the hearth with the water cooled side walls of the cooling elements providing water cooling of clearance gaps between adjacent cooling elements.

The use of water cooled side walls enables a simple and robust design utilising vertical, preferably flat, side walls that are substantially free of interlocking or other sealing between adjacent elements that might otherwise be required to prevent molten metal penetrating any such gaps and contacting the shell. Such concerns are exacerbated in a slag zone of direct smelting process with an agitated and well mixed bath of molten metal and slag.

The clearance gaps between adjacent cooling elements may be 20 mm or less.

Preferably the clearance gaps are 15 mm or less.

More preferably the clearance gaps are in the range of 5-20 mm.

The invention further provides a cooling element for location in a refractory lined hearth of a direct smelting vessel having water cooled panels located on a side wall of said vessel immediately above said cooling element, the cooling element comprising a hollow open-backed shell structure having water cooled base, top, front and side walls formed integrally in a cast structure, the top wall comprising a substantially horizontal section extending from a rear of the cooling element, the top wall further comprising a sloping surface extending downwardly from the horizontal section to the front wall, the horizontal section extending radially towards the front wall and transitioning into said sloping section at a point that, when installed in said vessel, is located adjacent a front face of a water cooled panel located immediately above the horizontal section of the top wall.

BRIEF DESCRIPTION OF THE DRAWINGS

In order that the invention may be more fully explained one particular embodiment of a direct smelting vessel and a cooler element of a hearth cooler will be described in some detail with reference to the accompanying drawings in which.

DETAILED DESCRIPTION OF THE PREFERRED EMBODIMENT

FIGS. 1 to 6 of the drawings illustrate a direct smelting vessel suitable for operation of the HIsmelt process as described in U.S. Pat. No. 6,267,799 and International Patent Publication WO 96/31627. The metallurgical vessel is denoted generally as 11 and has a hearth 12 which includes a base 13 and sides 14 formed of refractory bricks, a forehearth 15 for discharging molten metal continuously and a tap hole 16 for discharging molten slag.

Figure 1:
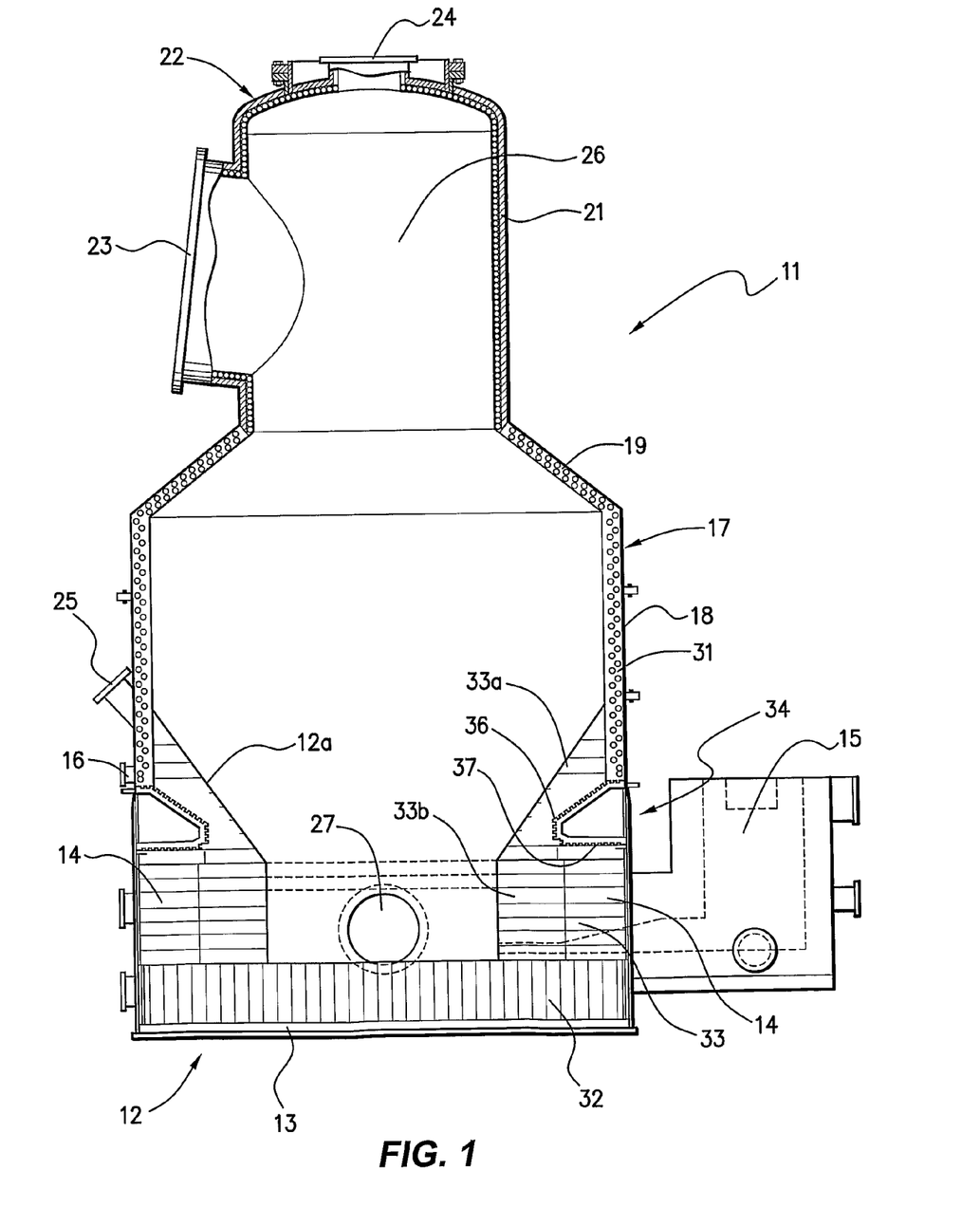
FIG. 1 is a vertical cross section through the embodiment of the direct smelting vessel provided with a hearth cooler in accordance with the present invention.
Figure 2:
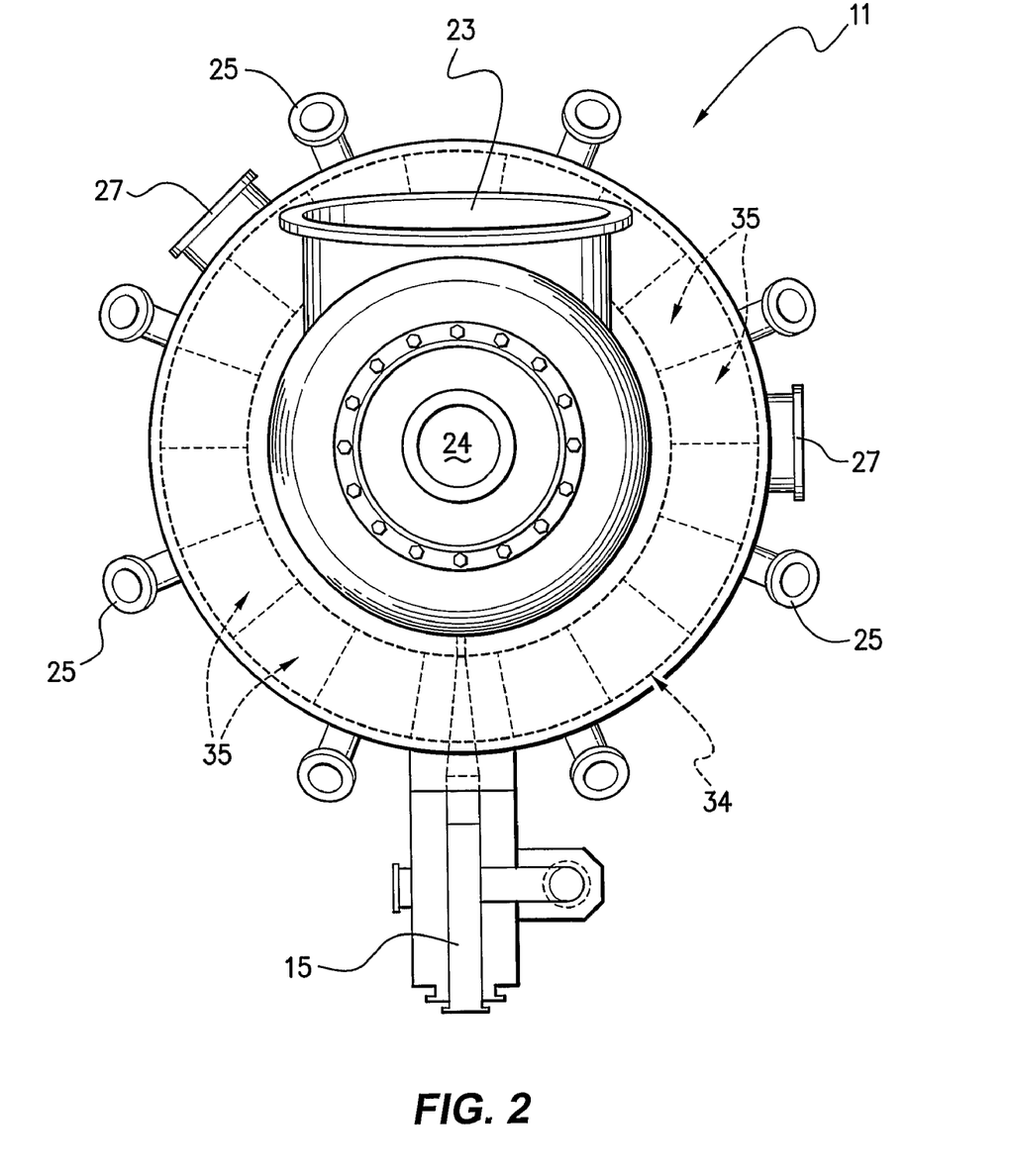
FIG. 2 is a plan view of the vessel shown in FIG. 1.

The base of the vessel is fixed to the bottom end of an outer vessel shell 17 made of steel and comprises a cylindrical main barrel section 18, an upwardly and inwardly tapering roof section 19, and an upper cylindrical section 21 and lid section 22 defining an offgas chamber 26. Upper cylindrical section 21 is provided with a large diameter outlet 23 for offgases and the lid 22 has an opening 24 in which to mount a downwardly extending gas injection lance (not shown) for delivering a hot air blast into the upper region of the vessel. The main cylindrical section 18 of the shell has eight circumferentially spaced tubular mountings 25 through which to extend solids injection lances (not shown) for injecting iron ore, carbonaceous material, and fluxes into the bottom part of the vessel.

In use the vessel contains a molten bath of iron and slag and the upper part of the vessel must contain hot gases under pressure and extremely high temperatures of the order of 1200° C. The vessel is therefore required to operate as a pressure vessel over long periods and it must be of robust construction and completely sealed. Access to the interior of the vessel is extremely limited, access essentially being limited on shut down through lid opening 24 and reline access doors 27.

Vessel shell 17 is internally lined with a set of cooling panels 31 through which cooling water can be circulated and these cooling panels are coated with refractory material to provide a water cooled internal refractory lining for the vessel above the smelting zone. It is important that the refractory lining be virtually continuous and that all of the refractory material be subject to cooling as uncooled refractory will be rapidly eroded. The panels are formed and attached to the shell in such a way that they can be installed internally within the shell 17 and can be removed and replaced individually on shut down without interfering with the integrity of the shell. The construction and installation of panels 31 may be carried out in the manner fully disclosed in U.S. Pat. No. 6,267,799 and International Patent Publication WO 96/31627.

Figure 3:
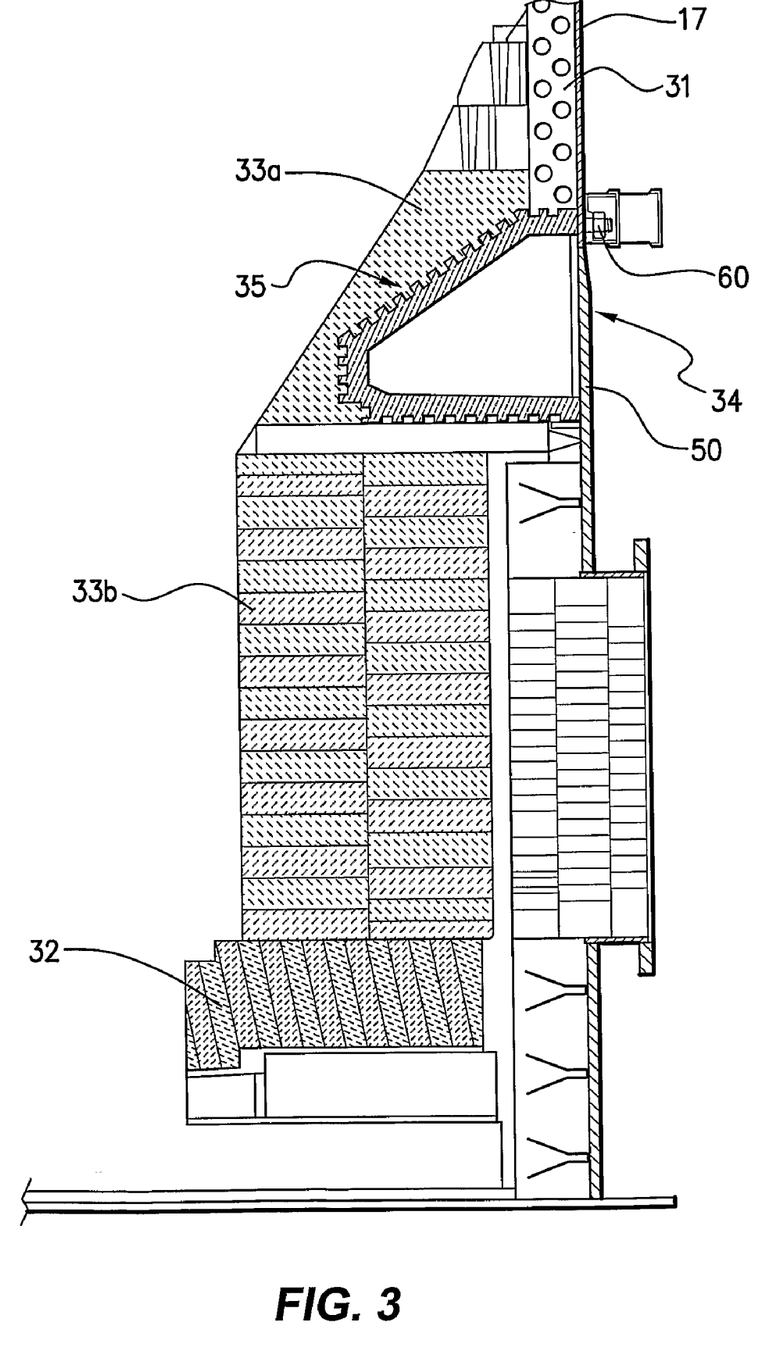
FIG. 3 is an enlargement of a lower part of the vessel of FIG. 1.

The base 13 of hearth 12 of the vessel is formed by deep refractory bricks 32 and the side 14 of the hearth is lined with successive courses of refractory bricks 33. The upper part 12a of the hearth tapers upwardly and outwardly to the vessel wall 18. In use of the vessel this part of the hearth is exposed to splashing with molten metal and slag. In accordance with the present embodiment this part of the hearth incorporates a cooler denoted generally as 34 disposed outwardly behind the bricks 33a lining the upper part of the hearth and disposed below the lowermost part of the cooling panels 31 on the side walls of the vessel.

Cooler 34 is formed by a series of individual cooler panel elements 35 disposed in an array extending circumferentially in the upper part of the hearth. It has a stepped upper cooling surface 36 extending upwardly and outwardly immediately behind the refractory lining 33a of the upper part of hearth 12 and a bottom flat cooling surface 37 resting on refractory bricks of the cylindrical courses of bricks 33b lining the side of hearth 12 below the upper part of the hearth.

Each cooler element 35 is self-supporting with respect to the underlying refractory bricks of the hearth 12. Specifically, each cooler element 35 is mounted to the outer vessel shell 17, as described hereinafter. It is noted that, whilst the cooler elements 35 are not supported significantly by the refractory bricks, the cooler elements nevertheless have the effect of assisting retaining the refractory bricks in place and reducing the tendency of the bricks to floating within the molten bath.

Figure 4:
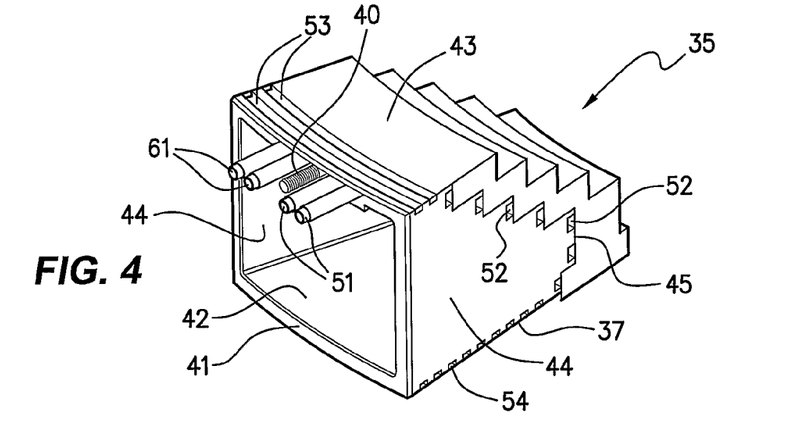
FIG. 4 is a perspective view of the embodiment of the cooler element of the hearth cooler.
Figure 5:
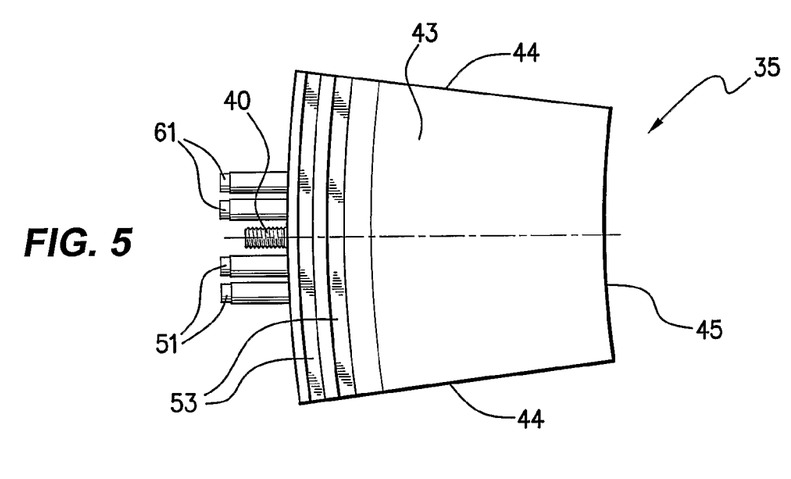
FIG. 5 is a plan view of the hearth cooler element.
Figure 6:
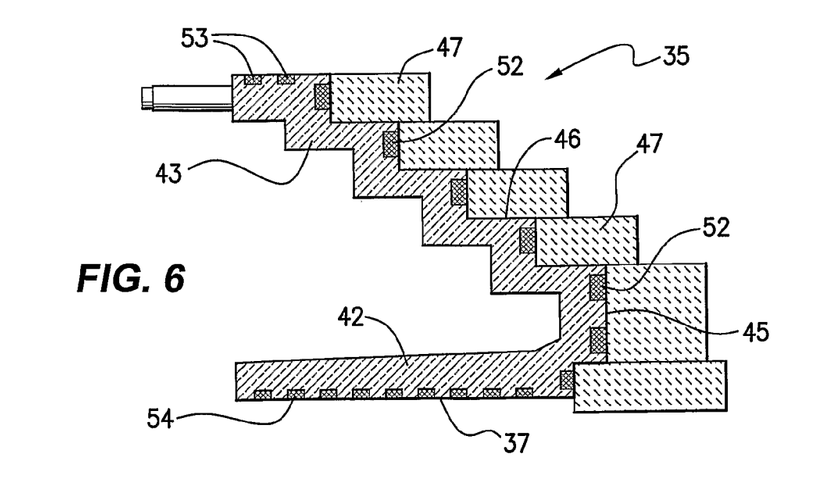
FIG. 6 is a vertical cross-section through the cooler element.

As most clearly seen in FIGS. 4 to 6, each cooling element 35 of cooler 34 comprises a hollow open backed cast shell structure 41 having a base wall 42 a top wall 43, a pair of side walls 44, and a front wall 45. The base wall 42 and the side walls 44 are flat with continuous outwardly facing surfaces whereas the top wall 43 inclines downwardly to the front wall 45 of the shell structure 41. Top wall 43 may be stepped such that its upper outwardly facing surface, which is a continuous surface, has a series of stepped tier surfaces 46 extending across the element to support refractory bricks 47 of the refractory lining 33*a* of the upper part of the hearth 12.

The shell 41 of each cooler element 45 is cast as a unitary structure in a metal of high thermal conductivity such as copper or a copper alloy. A pair of copper or nickel (or alloy) tubes 48*a*, 48*b* are cast within this structure so as to form a series of coolant flow passages disposed in an array extending throughout the base, top and side walls 42, 43, 44, respectively, of the cooler element. The casting method disclosed in U.S. Pat. No. 6,280,681 is suitable for forming the cooler element 45.

Each tube 48*a*, 48*b* is formed initially as a straight length of tube and then bent into a required serpentine arrangement, discussed further below, and positioned in a mould in which molten metal is subsequently poured to form the cast structure. The arrangement of tubes 48*a*, 48*b* shown in the Figures is typical of a number of different arrangements that could be used to achieve an appropriate flow of coolant (generally but not necessarily water) through the walls of the cooler element 35.

Figure 7:
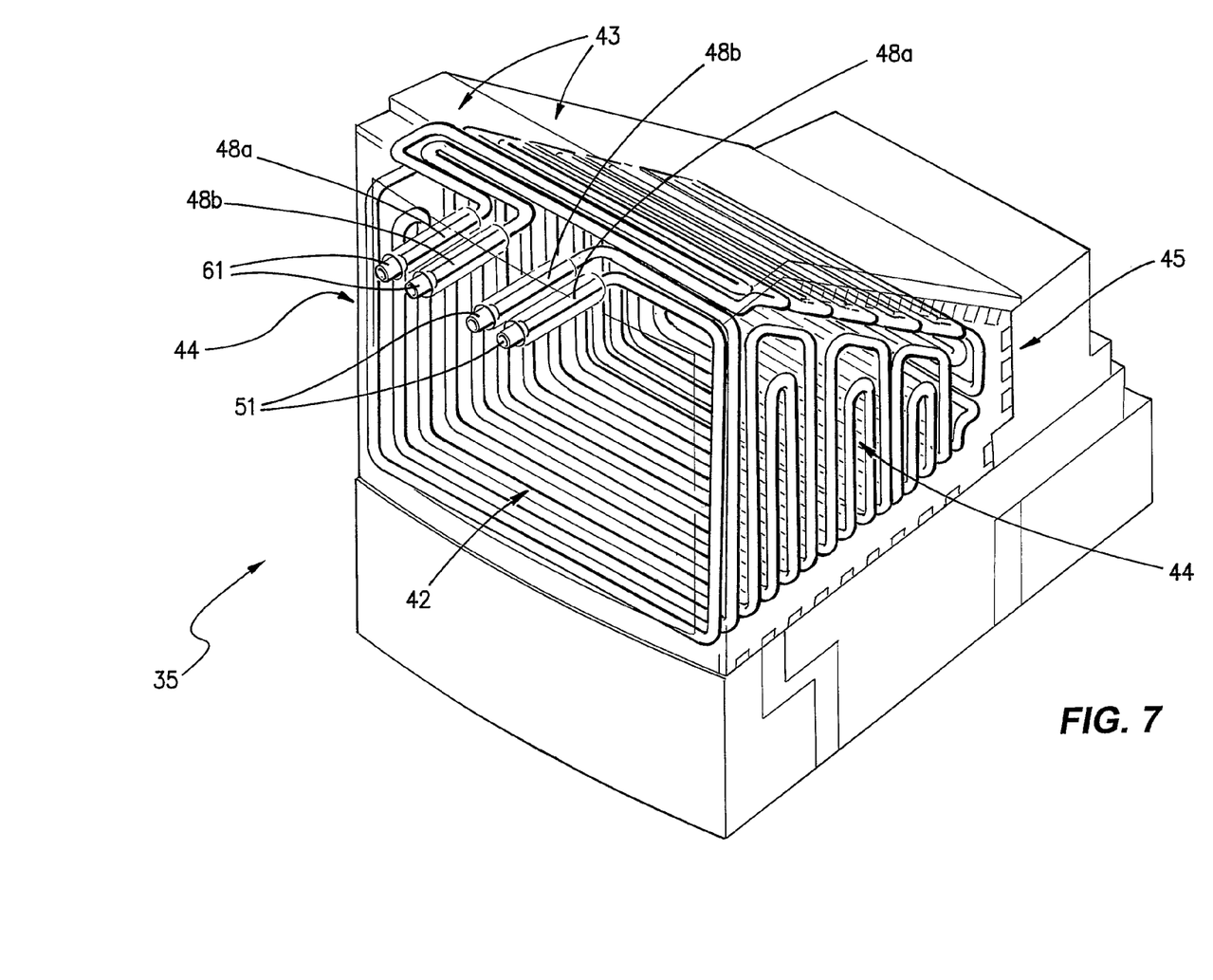
FIG. 7 is a diagrammatic representation of the cooler element showing the configuration of coolant flow passages formed within it, as viewed from the rear of the element.
Figure 8:
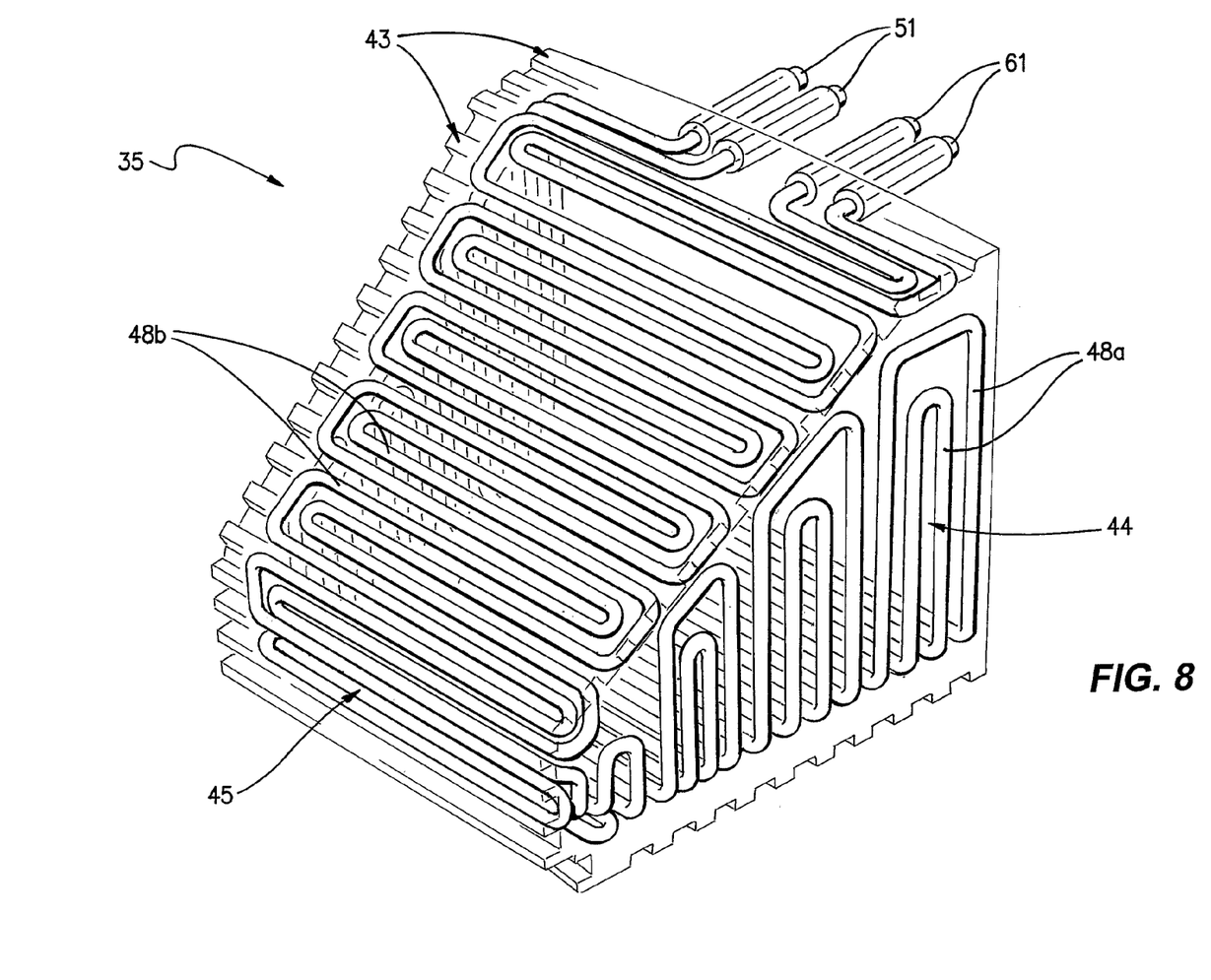
FIG. 8 is another diagrammatic representation of the cooler element showing the configuration of coolant flow passages formed within it, as viewed from the front of the element.

With reference to FIGS. 7 and 8, the tubes 48*a*, 48*b* forming the coolant flow passages extend from the upper part of the open back of the cooler element 35 and are fitted with inlet connectors 61 and outlet connectors 51 for flow of coolant to and from the coolant flow passages defined by the tubes 48*a*, 48*b*.

Specifically, the inlet ends of the tubes 48*a*, 48*b* extend outwardly to the left side wall 44 as shown in FIGS. 4, 7, and 8, and then forwardly a short distance in the plane of the top wall 43 and then across the top wall 43 to the right side wall 44 as shown in the Figures. This basic arrangement of the tubes 48*a*, 48*b* is repeated along the top wall 43 and down the front wall 45 until the tubes 48*a*, 48*b* reach the base wall 42 at the front of the cast shell structure 41. The tubes 48*a*, 48*b* then extend in a return path to the outlet connectors 51 in the open back of the cooling element 35. Specifically, the tubes 48*a*, 48*b* extend rearwardly a short distance in the plane of one of the side walls 44, across the base wall 42 to the other side wall 44, vertically up to the top wall 43, rearwardly a short distance in the plane of the side wall 44, vertically downwardly to the base wall 42, and across the base wall 42 to the other side wall. The basic arrangement is then successively repeated until the tubes 48*a*, 48*b* reach the outlet connectors 51.

A screw threaded stud 40 projects outwardly from the upper part of the open back of each cooler element 35 between the respective inlet and outlet connectors 51. The cooler elements are firmly fastened in position by resting their lower back parts on steel foot plates 50 welded to the outer steel shell 17 of vessel 11, passing the threaded studs 40 through holes in shell 17 and completing the fastenings by fitting nuts 60 to the studs. In this way, the cooler elements 35 are supported by the outer steel shell 17 rather than by the underlying refractory bricks in the hearth 12. Hence, it is possible to replace the refractory bricks without having to also remove the cooler elements 35.

Each cooler element 35 is shaped as a ring segment with the side walls 41 convergent and the cooler is formed by a plurality of those elements disposed side by side to form a circular ring cooler 34 with the base walls 42 of the cooler elements 35 forming a flat ring base, the top walls 43 of the cooler elements 35 forming an upwardly and outwardly inclined ring surface and the side walls 44 of the cooler elements 35 extending radially of the ring.

The inner and outer margins of each cooler element 35 are curved to extend circumferentially of the ring. Where steps are located in the top wall 43 they may also be curved so that the flat tier surfaces 47 of the cooler elements 35 together form a series of circular tiers extending around the circular half of the vessel.

The vertical step surfaces between the upper tier surfaces 46 are provided with linear grooves 52 which extend across each element 35 and in the assembled cooler line up to form annular grooves into which a flexible castable material can be packed to form seals between the stepped surface of the cooler and the refractory bricks 47. Additional groove 53, 54 are formed in the flat upper and lower outwardly facing surfaces of each cooler element 35 to extend across the cooler element 35 and to receive castable packing material to abut courses of refractory bricks immediately above and immediately below the cooler 34.

In the illustrated embodiment of the invention the refractory lining of the upper part of the hearth 12 is efficiently cooled and supported by the cooler 34 and this significantly reduces the rate of erosion of the refractory material. Operation of the cooler 34 also causes slag to freeze onto its surface if all of the refractory is eroded away. The incorporation of the cooler into the upper part of the hearth 12 prevents slag and molten metal from washing in behind or underneath the bottom row of cooling panels 31 as can occur in the event that the refractory in the slag zone were to erode completely.

The described embodiment of the invention has been advanced by way of example only and it is to be understood that the invention is not limited to the constructional detail of that embodiment.

By way of example, although the cooler elements 35 with stepped upper walls forming upright wall sections at the front margins of those elements is one option, another option is to modify this construction such that the top walls 43 meet the base walls at an acute angle or join with upright front walls at the front parts of those elements. The top wall 43 could be formed without steps and with a generally conically curved upper (although still retaining annular grooves into which flexible castable material can be packed) and the overlaying refractory bricks could thus be shaped to smoothly abut that upper surface. This option is schematically shown in FIG. 7. It is to be understood that this and many other variations will fall within the scope of the invention.

Further, it is understood that while the cooling elements 35 are cast with an open-backed shell structure, the addition of a backing plate, whether fixed or otherwise does not limit the invention.

Further, the present invention is not confined to the particular arrangement of tubes 48*a*, 48*b* in the cooling element 35 shown in the Figures. In an alternative, although not the only other possible alternative, arrangement, the inlet end of one of the tubes extends outwardly to the right side wall 44 as shown in FIGS. 4, 7, and 8, and then vertically downwardly to the base wall 42, across the base wall 42 to the left side wall 44 as shown in the Figures, vertically upwardly to the top wall 43, forwardly and then vertically downwardly in the plane of the side wall 44 to the base wall 41, and then across the base wall 42 to the right side wall 44 as shown in the Figures. This basic arrangement of the tube is repeated until the tube 48*a* reaches the front of the cast shell structure 41. The basic arrangement is then reversed and successively repeated until the other tube reaches the outlet connection 51. In addition, the inlet end of the tube extends outwardly to the to the left side wall 44 as shown in FIGS. 4, 7, and 8, and then forwardly a short distance in the plane of the top wall 43 and then across the top wall 43 to the right side wall 44 as shown in the Figures. This basic arrangement of the tube is repeated along the top wall 43 and down the front wall 45 until the tube reaches the base wall 42 at the front of the cast shell structure 41. The basic arrangement is then reversed and successively repeated until the tube reaches the outlet connector 51.

The invention claimed is:

1. A direct smelting vessel including a refractory lined hearth, side walls extending upwardly from the hearth, and a plurality of cooling panels disposed around the side walls so as to form an interior lining on those side walls, wherein an inner surface of an upper part of the hearth extends upwardly and outwardly to the side walls of the vessel and said upper part of the hearth incorporates a cooler disposed outwardly behind the refractory lining of that part of the hearth and below the cooling panels on the side walls of the vessel; and wherein:
   (a) the cooler is formed as a ring by a plurality of cooler elements with the cooler elements each shaped as a segment of that ring with their side walls extending radially of the ring; and
   (b) each cooler element comprises a hollow open backed cast shell structure having a base wall, a pair of side walls, a front wall and a top wall formed integrally in the cast shell structure and incorporating coolant flow passages for flow of coolant therethrough.

2. The vessel defined in claim 1 wherein the hearth cooler has a cooling surface extending upwardly and outwardly immediately behind the refractory lining of the upper part of the hearth.

3. The vessel defined in claim 2 wherein a bottom part of the hearth and the side walls of the vessel are generally cylindrical, the cooling surface of the cooler extends upwardly and outwardly and the refractory lining of the upper part of the hearth overlays that cooling surface.

4. The vessel defined in claim 3 wherein the refractory lining of the upper part of the hearth is formed by courses of refractory bricks laid over the cooler.

5. The vessel defined in claim 4 wherein, below the upper part of the hearth, the hearth lining is formed by cylindrical courses of refractory bricks.

6. The vessel defined in claim 1 wherein the cooler elements are disposed in an array extending circumferentially around the upper part of the hearth.

7. The vessel defined in claim 6 wherein each cooler element is connected to an outer shell of the side wall of the vessel and consequently is not dependent on an underlying part of the hearth to support the element.

8. The vessel defined in claim 6 or claim 7 wherein the top wall of each cooler element comprises a solid outwardly facing surface formed at least in part as a sloping surface.

9. The vessel defined in claim 8 wherein the top wall of each cooler element has a surface that inclines downwardly as the sloping surface to the front wall of the cast shell structure.

10. The vessel defined in claim 9 wherein the top wall of each cooler element has a section that is parallel to the base wall and extends from the rear of the cooler element and defines a flat land.

11. The vessel defined in claim 10 wherein the size of the land of each cooler element is selected so that there is a transition to the downwardly sloping front face of the element at a point that is adjacent a front wall of the cooling panels that form part of the side walls of the vessel.

12. The vessel defined in claim 8 wherein the top wall is stepped such that outer surface has a series of stepped tier surfaces extending across the cooler element to support refractory bricks of the refractory lining of the upper part of the hearth.

13. The vessel defined in claim 8 wherein the side walls of each cooler element are convergent toward the front of the element.

14. The vessel defined in claim 8 wherein the cooler elements have front parts curved to extend circumferentially of the ring.

15. The vessel defined in claim 8 wherein the side walls of each cooler element are formed with flat outwardly facing surfaces.

16. The vessel defined in claim 8 wherein the cooler elements are positioned in side by side relationship with a small clearance between adjacent elements.

17. The vessel defined in claim 16 wherein the clearance between adjacent cooler elements is 20 mm or less.

18. The vessel defined in claim 16 wherein the clearance is 15 mm or less.

19. The vessel defined in claim 16 wherein the clearance is in the range of 5-20 mm.

20. The vessel defined in claim 8 wherein the cooler elements have coolant inlet and outlet connectors for flow of coolant to and from the coolant flow passages.

21. The vessel defined in claim 20 wherein the coolant flow passages are formed by tubes cast into the shell structure of each cooler element and extending between inlets and outlets at the open back of the shell.

22. A copper or copper alloy cooler element for cooling refractory material in a hearth of a smelting vessel, the cooler element comprising:
   a hollow open-backed shell structure having base, top, front and side walls formed integrally in a cast structure and incorporating coolant flow passages therein formed by tubes cast into the shell structure and extending between inlets and outlets at the open back of the cooler element, with the top wall providing a solid outwardly facing surface formed at least in part as a sloping surface;
   wherein the cooler element is shaped as a ring segment with the side walls being convergent; and
   wherein the cooler element is configured to be disposed side-by-side with at least one other cooler element to form a circular ring cooler.

23. The cooler element defined in claim 22 wherein the tubes that form the coolant flow passages are disposed in an array extending throughout the base, top, front and side walls of the cooler element.

24. The cooler element defined in claim 22 or claim 23 wherein the coolant flow passages are in the form of at least two continuous tubes which follow serpentine paths extending through the base, top, front and side walls.

25. The cooler element defined in claim 24 wherein the serpentine paths are adjacent serpentine paths.

26. The cooler element defined in claim 24 or claim 25 wherein each tubes is structured so that coolant can flow in one flow path through the top wall and the front wall and then in a return flow path through the side walls and the base wall to an outlet or vice versa.

27. The cooler element defined in claim 26 wherein the flow paths of each tube follow a serpentine path across and adjacent to the top, front, side, and base walls of the cooler element.

28. The cooler element defined in claim 27 wherein the flow path of each tube though the base wall and the side walls is a sequential path between a front of the cooler element and a rear of the cooler element passing through the base wall and the side walls.

29. The cooler element defined in claim 28 wherein the sequential path is a serpentine path that passes repeatedly through each of the base wall and the side walls.

30. The cooler element defined in claim 22 wherein the top and front walls form one generally inclined outwardly facing surface that slopes downwardly from the rear of the cooler element to the base wall at the front of the cooler element and defines a front face of the element.

31. The cooler element defined in claim 30 wherein the top wall has a section that is parallel to the base wall and extends from the rear of the cooler element and defines a flat land.

32. The cooler element defined in claim 30 or claim 31 wherein the sloping surface of the top wall is stepped such that its outer surface has a series of stepped tier surfaces extending across the element.

33. The cooler element defined in claim 32 wherein the tiers are sized to separately receive a single row of refractory bricks resting on the tier.

34. The cooler element defined in claim 32 or claim 33 wherein the front face of each step in an upper surface on the top wall has a linear groove extending across the cooler element.

35. The cooler element defined in claim 22 wherein the cooler element is configured to be disposed side-by-side with the at least one other cooler element such that the bases of the cooler elements form a flat ring base, the top walls of the cooler elements form an upwardly and outwardly inclined ring surface having horizontal flat tiers and the side walls of the cooler elements extend radially of the ring.

36. A cooling element for location in a refractory lined hearth of a direct smelting vessel, the cooling element comprising:

a hollow open-backed shell structure having water cooled base, top, front and side walls formed integrally in a cast structure, with the cooling element shaped as a ring segment with the side walls being convergent such that the cooling element is configured for co-location with other of the cooling elements in the hearth to form a circular ring cooler with the water cooled side walls of the cooling elements providing water cooling of clearance gaps between adjacent cooling elements.

37. A cooling element for location in a refractory lined hearth of a direct smelting vessel having water cooled panels located on a side wall of said vessel immediately above said cooling element, the cooling element comprising:

a hollow open-backed shell structure having water cooled base, top, front and side walls formed integrally in a cast structure, the top wall comprising a substantially horizontal section extending from a rear of the cooling element, the top wall further comprising a sloping surface extending downwardly from the horizontal section to the front wall, the horizontal section extending radially towards the front wall and transitioning into said sloping section at a point that, when installed in said vessel, is located adjacent a front face of a water cooled panel located immediately above the horizontal section of the top wall;

wherein the cooling element is shaped as a ring segment with the side walls being convergent; and wherein the cooling element is configured to be disposed side-by-side with at least one other cooling element to form a circular ring cooler.

* * * * *